United States Patent [19]

Mishima

[11] Patent Number: 5,335,456
[45] Date of Patent: Aug. 9, 1994

[54] METHOD OF FORMING RIB SURFACES ON A POWER TRANSMISSION BELT

[75] Inventor: Kyoichi Mishima, Kobe, Japan

[73] Assignee: Mitsuboshi Belting Ltd., Kobe, Japan

[21] Appl. No.: 945,737

[22] Filed: Sep. 16, 1992

[30] Foreign Application Priority Data

Sep. 20, 1991 [JP] Japan .................. 3-270208

[51] Int. Cl.⁵ ............................ B24B 19/02
[52] U.S. Cl. .................. 51/281 R; 51/165.87
[58] Field of Search .......... 51/281 R, 165.71, 165.74, 51/165.87, 165.88, 74 R, 76 R, 137, 139, 134.5, 325; 156/139, 140, 142

[56] References Cited

U.S. PATENT DOCUMENTS

| | | | |
|---|---|---|---|
| 3,798,846 | 3/1974 | Smith | 51/134.5 R |
| 3,891,405 | 6/1975 | Huber | 156/142 |
| 3,913,277 | 10/1975 | Hahn et al. | 51/134.5 R |
| 4,137,787 | 2/1979 | Waugh | 156/142 |
| 4,177,688 | 12/1979 | Howerton et al. | 156/142 |
| 4,231,826 | 11/1980 | Wrast | 156/142 |
| 4,305,714 | 12/1981 | Renshaw | 156/142 |
| 4,322,916 | 4/1982 | Richmond | 156/142 |
| 4,329,192 | 5/1982 | White, Jr. et al. | 51/236 |
| 4,604,835 | 8/1986 | Borin | 51/134.5 R |
| 4,622,779 | 11/1986 | Schadlich | 51/134.5 R |
| 4,931,118 | 6/1990 | Kitahama et al. | 156/142 |
| 5,192,382 | 3/1993 | Hamura et al. | 156/139 |

*Primary Examiner*—Jack Lavinder
*Attorney, Agent, or Firm*—Wood, Phillips, Van Santen, Hoffman & Ertel

[57] ABSTRACT

A method of forming a rib on a power transmission belt including the steps of providing an endless belt body having an elastic material to define at least part of a longitudinal rib on a completed power transmission belt, providing a grinding wheel with a peripheral cutting surface, rotating the grinding wheel in a first rotational direction, pressing the peripheral cutting surface of the grinding wheel against the belt body and grinding the body to define a rib thereon with an exposed surface defined by the elastic material, and altering the rotational velocity of the peripheral cutting surface to compensate for wear on the grinding wheel.

26 Claims, 3 Drawing Sheets

METHOD OF FORMING RIB SURFACES ON A POWER TRANSMISSION BELT

BACKGROUND OF THE INVENTION

1. Field of the Invention

This invention relates to power transmission belts and, more particularly, to a method of forming side surfaces on belt ribs with a grinding element to avoid variation in the frictional coefficient between the side surfaces and cooperating pulley surfaces by reason of wear on the grinding element due to extended use thereof.

2. Background Art

V-ribbed belts are being used increasingly in different environments. V-ribbed belts are commonly utilized on automobiles, agricultural implements, and domestic electrical devices, to name just a few applications.

The V-ribbed belt operates differently than a V-belt and has certain advantages thereover. The V-ribbed power transmission belt is normally thinner than a V-belt. Resultingly, it is more flexible and can be wrapped around small diameter pulleys to contribute to an overall compact system design. Further, the ribs on the V-ribbed belt do not move as deeply into cooperating pulley grooves as do the ribs on a conventional V-belt. Consequently, there is less binding that occurs between the belt and pulley as the ribs move into and out of the cooperating pulley grooves, compared to a conventional V-belt. Energy losses through friction generation are minimized. The smooth transition as the belt moves into and out of a cooperating pulley results in a lengthening of the V-ribbed belt life compared to a V-belt.

The binding between the ribs and pulley with a conventional V-belt causes a nonuniform tension throughout the belt length. Further, this binding produces unwanted noise during operation.

V-ribbed belts do, however, have a number of drawbacks. Excessive tension on the V-ribbed belt may cause it to slip relative to a cooperating pulley. Further, abrupt changes in load or drive force may also cause the same slippage. This slippage, in addition to adversely affecting the operation of the system with which the belt is associated, may cause excessive wear, crack generation, and localized removal of material from the ribs by the pulleys.

It has always been an objective of designers of V-ribbed belts to reduce noise generation. A certain amount of noise is generated when slippage between the belt and pulley occurs as well as when the belt ribs move radially into and out of cooperating pulley grooves. This latter condition is a result of what is commonly referred to as "stick-slip" friction in a radial direction.

It is known to reduce noise generation by covering the ribbed surface with a cloth layer. This cloth layer not only reduces noise but enhances the wear characteristics of the rib rubber. The principal drawback with using a cloth layer is that the method for coating the rib rubber with cloth is relatively complicated. Another drawback is that the flexibility of the belt is deteriorated as is its bending fatigue resistance.

It is further known to mix short staple reinforcing fibers laterally in the ribs of a V-ribbed belt. These fibers, in addition to reinforcing the rib rubber, also tend to damp noise as the ribs impact and slide against cooperating pulley surfaces.

Typically, the belts with the short staple reinforcing fibers are manufactured by sequentially building belt components onto a forming drum/mandrel. The components are assembled in inside out order. A typical sequence of parts buildup is disclosed in Japanese patent publication No. Sho 52-17552. It is taught therein to apply a canvas layer, an upper rubber layer, tensile cords, and a lower rubber layer on a mandrel/forming drum. The assembled components are then vulcanized. The outermost rubber layer is formed using a rotary, stone grinding wheel. The grinding wheel has V-shaped cutting surfaces to produce grooves between adjacent V-ribbed belts or grooves between adjacent ribs on V-ribbed belts. The cutting surface of the grinding wheel forms the pulley-engaging side surfaces on the ribs.

While this method has been successfully practiced in the past, one problem that has been contended with is that due to the variation in the characteristics of the grinding wheel over time. Whereas a new grinding wheel tends to effect a clean severance of the fibers, wear on the grinding wheel over time inhibits the ability of the grinding wheel to cleanly sever the fibers and results in the fiber's protruding progressively further beyond the rib side surfaces as the grinding wheel wears in use. Since the frictional characteristics of the rib side surfaces depend upon the extent of exposure of the fibers, the belt performance varies significantly depending upon the age of the grinding wheel. Thus, quality control becomes difficult.

To avoid significant variation in the frictional characteristics of the belt, the grinding wheels may be periodically replaced. Commonly, the grinding wheels are made with a diamond polishing/cutting surface. These grinding wheels are relatively expensive.

Another problem that is encountered in the art results from the use of new grinding wheels. When the ribs of a V-ribbed belt are formed with a new grinding wheel, the reinforcing fibers are cleanly severed so that the ends thereof are flush with the rubber defining the belt side surface. During operation, the rubber coats the exposed ends of the fibers so that the friction reducing effect of the exposed fibers is progressively diminished. A large coefficient of friction results between the rib surfaces and pulleys to produce the aforementioned "stick-slip" condition. Eventually, the "stick-slip" problem may become excessive as the cut edges of the fibers become fully covered with rubber.

To eliminate this "stick-slip" problem, it is known to increase the quantity of short staple reinforcing fibers to reduce the coefficient of friction between the rib side surfaces and cooperating pulleys. However, the addition of fiber introduces other problems. First of all, as the proportion of fiber to rubber becomes greater, it is more difficult to uniformly mix the fibers without creating irregular disposition of the fiber. There is a tendency of the fibers to tangle and create voids which weaken the belt. Further, the additional fibers inherently compromise the bending characteristics of the belt.

SUMMARY OF THE INVENTION

The present invention is specifically directed to overcoming the above enumerated problems in a novel and simple manner.

More particularly, the present invention is directed to a method of forming a rib on a power transmission belt. The present invention contemplates the steps of providing an endless belt body having an elastic material to define at least part of a longitudinal rib on a completed power transmission belt, providing a grinding wheel with a peripheral cutting surface, rotating the grinding wheel in a first rotational direction, pressing the peripheral cutting surface of the grinding wheel against the belt body and grinding the body to define a rib thereon with an exposed surface defined by the elastic material, and altering the rotational velocity of the peripheral cutting surface to compensate for wear on the grinding wheel.

The principal objective of the present invention is to produce belts with a uniform coefficient of friction between the belts and cooperating pulleys by compensating for variation in the cutting characteristics of the grinding wheel.

Preferably, the frictional coefficient between the belt ribs and cooperating pulleys is maintained within a predetermined range throughout the useful life of the grinding wheel. Preferably, the frictional coefficient is maintained to be within ±0.1 of a preselected coefficient of friction for a speed of 7 to 32 m/sec for the peripheral cutting surface on the grinding wheel.

More particularly, according to the invention, the speed of the peripheral cutting surface of the grinding wheel is related to the cumulative grinding time for the grinding wheel by the following equation:

$$0.8 \, (7+X/100) \leq Y \leq 1.2 \, (7+X/100)$$

where Y is the speed of the peripheral surface of the grinding wheel in meters per second and X is the cumulative grinding time for the grinding wheels in hours.

In one form, the grinding wheel cutting surface is formed by a diamond polishing material of 50 to 200 mesh.

The inventive method is particularly adapted to form the side surfaces of belt ribs having short staple reinforcing fibers therein. By controlling the rotational speed of the grinding wheel, the protrusion of the severed fibers can be maintained relatively constant to keep the coefficient of friction between the rib side surfaces and pulleys constant throughout the useful life of the grinding wheel. This obviates the need to replace the oft times expensive grinding wheels.

In one form of the belt the reinforcing fibers are one of a) synthetic yarns made of one of monofilaments such as nylon, vinylon, polyester and aromatic polyamide and b) a yarn that is a mixture of natural fiber yarns made of at least one of cotton and pulp with the synthetic yarn.

The elastic material within which the fibers are embedded is preferably rubber that is one of natural rubber (NR), styrenebutadiene rubber (SBR), chloroprene rubber (CR) and the like, or a mixture thereof.

In a preferred form of the invention, the belt body is rotated as it is formed by the grinding wheel. The directions of rotation for the belt and grinding wheel can be either the same or opposite.

The invention further contemplates the formation of a belt sleeve from which a plurality of individual belts can be cut.

In one form of the invention, the grinding wheel is defined by a plurality of annular, V-shaped cutting surfaces which are spaced axially with respect to the grinding wheel. The width of the grinding wheel may be less than the axial width of the belt sleeve to thereby require multiple grinding steps to complete the formation of the belt sleeve surface.

The invention further contemplates the preforming of a belt sleeve by sequentially building individual components up on a forming drum/mandrel. In a preferred form, the belt components are arranged in inside out order so that the inside belt surface, on which the ribs are formed is exposed to be readily ground.

Preferably, the belt sleeve is vulcanized prior to the carrying out of the grinding step.

DETAILED DESCRIPTION OF THE DRAWINGS

The present invention is directed to a method of forming side surfaces on the ribs of a power transmission belt to maintain the coefficient of friction between the belt rib side surfaces and a cooperating pulley surface relatively constant over the useful life of a grinding wheel used to form those surfaces. The present invention can be practiced on V-belts, V-ribbed belts, etc. However, the present invention is particularly adaptable to the formation of V-ribbed belts, such as that shown at 10. Accordingly, while the description below will be focused on the formation of a V-ribbed belt, it should not be viewed as limiting the invention to such a belt.

Figure 1:
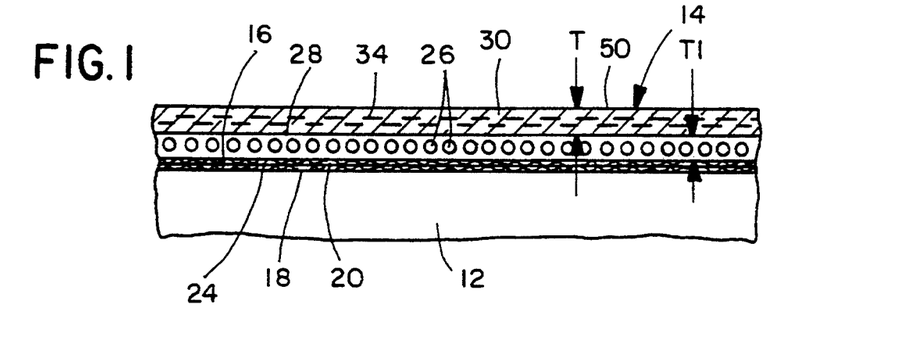
FIG. 1 is a cross-sectional view of a portion of a completed belt sleeve in inside out orientation on a forming drum.

One method of forming the belt 10, according to the present invention, is described initially with respect to FIG. 1. In FIG. 1, a cylindrical forming drum/mandrel 12 is shown to support an endless belt sleeve 14 defined by a plurality of components built up sequentially on the outer peripheral surface 16 of the forming drum/mandrel 12.

Figure 4:
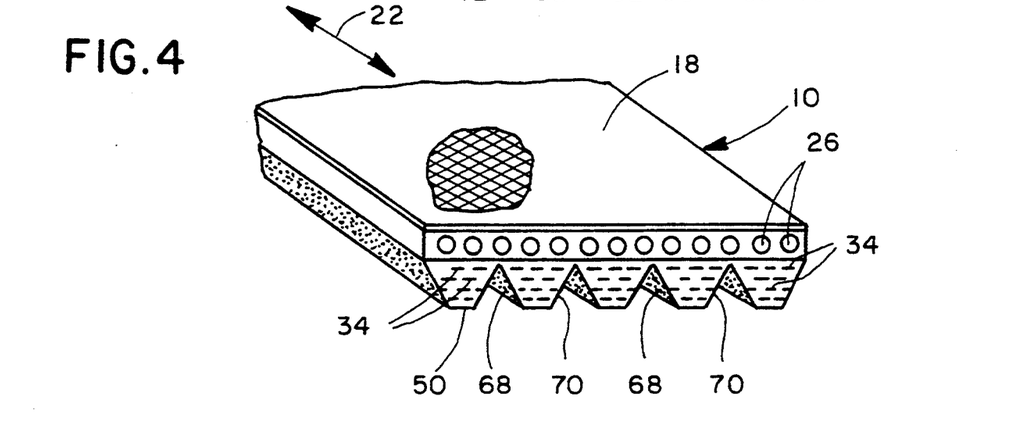
FIG. 4 is a fragmentary perspective view of an exemplary V-ribbed belt that can be made according to the present invention.

One exemplary belt construction, shown in FIG. 4, has at least one, and in the embodiment shown, two layers 18, 20 of rubber-coated fabric on the outside surface. A suitable fabric has good expandability and is made by woven warp and weft cotton yarns so that the direction of expandability of the fabric is primarily in the longitudinal direction of the belt, as indicated by double-headed arrow 22 in FIG. 4. An upper adhesive rubber layer 24 is applied over the fabric layer 20. The rubber in the layer 24 is made preferably from a single material, such as natural rubber (NR), styrenebutadiene rubber (SBR), chloroprene rubber (CR) etc., or a mixture thereof. Tensile cords 26 are formed by spirally wrapping a cord around the adhesive rubber layer 24 and define the belt neutral axis. The tensile cords 26 are made from a material having low elongation and high strength. Suitable materials are polyester, nylon, aromatic polyamide fiber, and the like. An inside rubber layer 28 is placed over the tensile cord 26.

A compression rubber sheet 30 is placed over the rubber layer 28. The sheet 30 preferably has a thickness T that is thicker than the combined thickness T1 of the rubber layers 24, 28 with the tensile cord 26 therein.

Short staple reinforcing fibers 34 are embedded in the rubber sheet 30 and are directed substantially parallel to each other in a direction that is laterally of the completed belt. More specifically, the fibers are formed by cutting one of a) synthetic fiber yarn made of monofilaments that are one or more of nylon, vinylon, polyester, aromatic polyamide, etc., and b) a yarn that is a mixture of natural fiber yarns of cotton, pulp, etc. with the synthetic yarn. A preferred length of the individual fibers is between 3-10 mm. The fibers 34 are mixed with the rubber in the compression rubber sheet 30 preferably in an amount of 5 to 30 weight parts of fiber to 34 per 100 weight parts of rubber. The rubber in the sheet 30 is preferably the same as the rubber in the rubber layers 24, 28.

With the belt components laminated together on the forming drum/mandrel 12, the belt sleeve 14 is vulcanized. Vulcanization can be carried out by pressure heating methods known to those skilled in the art. The resulting belt sleeve 14 is relatively flat and has a width from which a plurality of individual belts can be cut.

Once the sleeve 14 is vulcanized, it is removed from the forming drum/mandrel 12. The sleeve 14 is then placed on a grinding set-up shown at 36 in FIG. 2, which consists of a drive drum 38 and a driven drum 40, located in spaced relationship for rotation about spaced, parallel axes 42, 44.

A grinding wheel 46 is located adjacent to the drive drum 38. The grinding wheel 46 is rotatable about an axis 48 that is coincident with the plane containing the axes 42, 48 for the drum 38, 40. The grinding wheel 46 is situated to engage the belt sleeve 14, which is trained around the drums 38, 40 in its inside out state so that the inside belt surface 50, within which the individual ribs are to be formed, is exposed. The grinding wheel 46, as seen clearly in FIGS. 2 and 3, has an elongate, cylindrical body 52 with axially equidistantly spaced, annular V-shaped cutting teeth projecting therefrom. The cutting teeth 54 have cutting surfaces 56 made from diamond particulate of 50-200 mesh. The teeth 54 are spaced to define grooves 58 between adjacent ribs 60.

The grinding wheel 46 can be rotated in the same direction as the rotation of the belt sleeve 14 or the grinding wheel 46 and belt sleeve 14 can be rotated in opposite directions. Rotation of the grinding wheel is carried out by a means shown schematically at 62 in FIG. 2. The drive drum 38 is rotated by an appropriate means 64.

Figure 2:
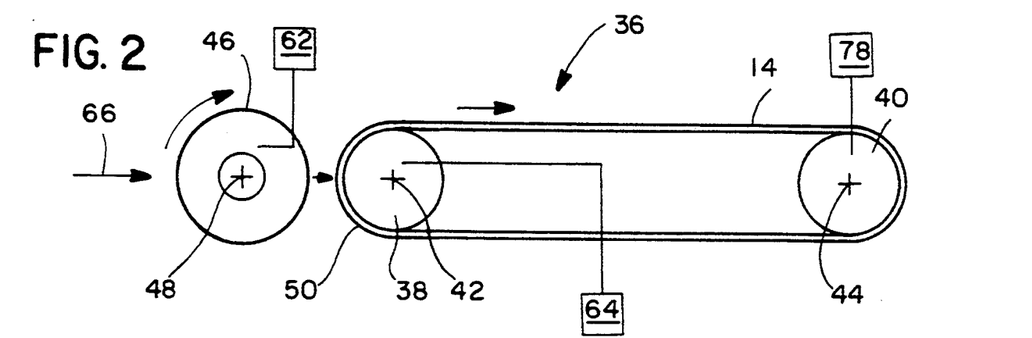
FIG. 2 is a schematic, side elevation view of the belt sleeve rotated about a pair of spaced drums and in relationship to a grinding wheel for forming ribs on the belt sleeve according to the present invention.
Figure 3:
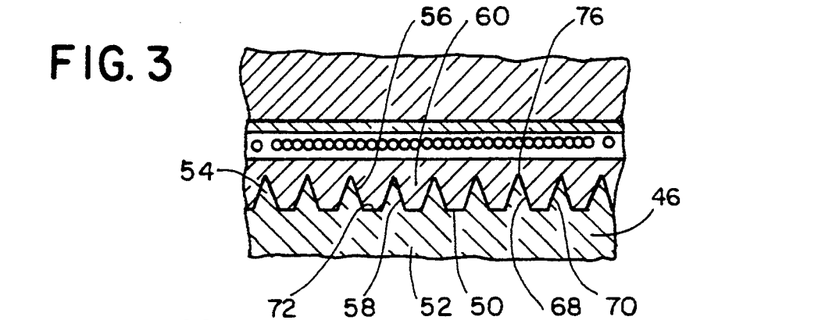
FIG. 3 is a cross-sectional view of a portion of the belt sleeve in relationship to the grinding wheel for forming ribs therein.

As the grinding wheel 46 and belt sleeve 14 are rotated, the grinding wheel 46 is advanced in the direction of arrow 66 towards the exposed belt surface 50. As this occurs, the grinding wheel teeth 54 progressively cut out the rubber in the sheet 30 to define the oppositely facing side surfaces 68, 70 on the belt ribs 60. The grinding step is completed with the root 72 on the grinding wheel between adjacent teeth 54 in abutment with the inside belt surface 50.

As the grinding wheel 46 effects formation of the rib side surfaces 68, 70, it simultaneously cuts the rubber in the ribs 60 and the reinforcing fibers 34. The invention contemplates controlling the rotational velocity of the grinding wheel 46 with the means 62 to compensate for wear on the grinding wheel to make certain that the side surfaces 68, 70 and fibers 34 are uniformly cut throughout the useful life of the grinding wheel 46. To accomplish this, the rotational velocity of the cutting wheel 46 is increased as the grinding wheel is worn through use.

A specific relationship between the circumferential speed of the peripheral edge 76 of the grinding wheel 46 and the cumulative grinding hours for the grinding wheel 46 is contemplated by the invention to achieve uniformity in belt manufacture. More particularly, the cumulative grinding time X (in hours) and circumferential speed of the grinding wheel Y (in meters per second) are, according to the present invention, related as follows:

$$0.8\ (7+X/100) \leq Y \leq 1.2\ (7+X/100),$$

where Y is the speed of the peripheral surface of the grinding wheel in meters per second and X is the cumulative grinding time for the grinding wheel in hours.

It has been found that so long as the circumferential speed of the grinding wheel 46 is maintained within the above range, the frictional coefficient between the rib side surfaces 68, 70, and cooperating pulley surfaces is maintained within a predetermined and desired range. This range has been found to produce a belt such that the coefficient of friction between the side surfaces and cooperating pulley surfaces is optimum in terms of both minimizing sound generation and avoiding slippage. This speed versus running time relationship is maintained for at least the last 0.1 mm of grinding.

According to the invention, the circumferential speed of the grinding wheel 46 varies in a range of ±20% of the central value of the circumferential speed Y. A variation of the speed of ±20% accounts for a variation in the frictional coefficient of ±0.1 for a circumferential speed range of 7 to 32 m/sec, which is commonly used. It has been found that the frictional coefficient between the guide surfaces 68, 70 resulting from this manufacturing process and a cooperating pulley surface is such that noise generation is adequately controlled.

An exemplary belt manufacturing process, according to the present invention, is described in detail below. The advantages resulting from practice of the inventive process are demonstrated through experimental results.

BELT SLEEVE DIMENSIONS AND SPEED

The belt sleeve 14 was constructed with an axial dimension of 285 mm, with the circumference thereof being rotated at 1130 mm per second.

| Composition of the Vulcanized Belt Sleeve 14 | |
|---|---|
| Polymer | 100 PHR |
| Aramid | 5 PHR |
| Nylon | 13 PHR |

-continued

| Composition of the Vulcanized Belt Sleeve 14 | |
| --- | --- |
| Carbon | 40 PHR |
| Softening Agent | 6 PHR |
| Vulcanizing Agent | 3 PHR |

GRINDING WHEEL (46)

The grinding/polishing wheel 46 had a mesh of 100.

The grinding wheel 46 was rotated at two different speeds. The first, middle speed, was used to grind the sleeve 14 from the point of initial contact until the grinding wheel formed the side surfaces to within 0.3 mm of their finished shape. This middle speed was a constant 1800 rpm.

The second grinding step is the step that is critical to the present invention. The grinding wheel 46 was rotated at a lower speed to grind the final 0.3 mm distance. The initial speed was 700 rpm, however this value would be changed depending upon the cumulative grinding time for the grinding wheel 46.

The rate of advance of the grinding wheel 46 towards the belt sleeve 14 was also carried out in two steps. During the middle speed, the grinding wheel 46 was advanced at 0.6 mm per minute. At the lower speed, the advancement was reduced to 0.08 mm per minute.

The belt sleeve 14 and grinding wheel 46 were rotated in the same direction during formation.

During the grinding, a load 78 of 840 kgf/80 rib was applied to the driven drum 40 to maintain a desired tension on the belt sleeve 14.

MEASUREMENT OF FRICTIONAL COEFFICIENT

Figure 6:
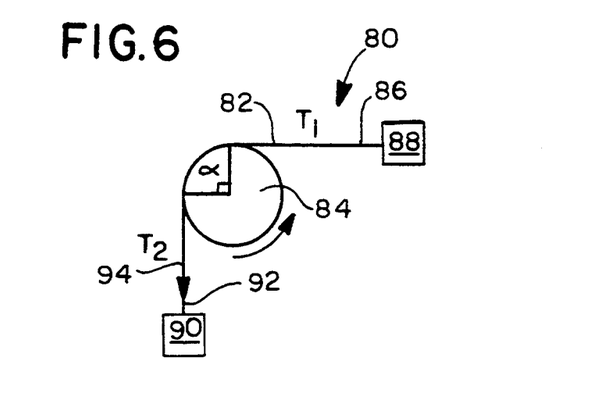
FIG. 6 is a schematic representation of a test setup to measure frictional coefficient between the side surfaces of a power transmission belt and cooperating pulley.

The individual belts were placed on a test set-up 80 designed to determine the coefficient of friction ($\mu$). The individual belts 82 were wrapped around a pulley 84 with a winding angle $\alpha$. One end 86 of the belt 82 was attached to a load cell 88 which produced a load T1. A load 90 was exerted on the other belt end 92 in the direction of arrow 94 as indicated by T2. The load 90 was 2 kgf/3 ribs. The coefficient of friction ($\mu$) was obtained by the following equation.

$$\mu = (1/\alpha) \ln (T1/T2).$$

After formation of the belt side surfaces 68, 70, the individual belts were allowed to cool for sixty seconds and then placed on a test setup as shown at 80 in FIG. 6.

Figure 5:
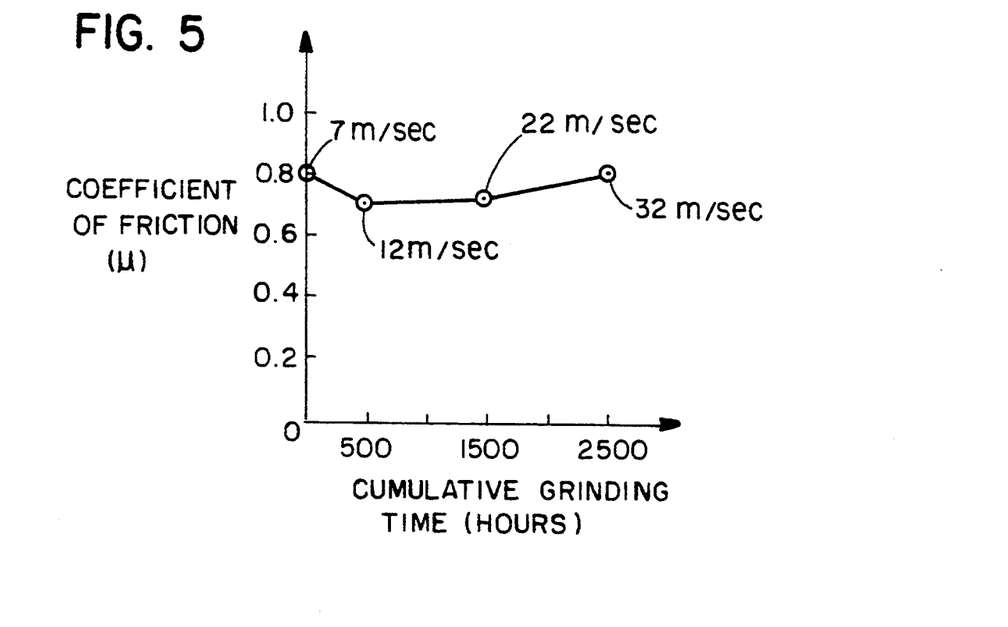
FIG. 5 is a graph showing the relationship between the cumulative grinding time for a grinding wheel and the frictional coefficient between the side surfaces of a power transmission belt formed with the grinding wheel and cooperating pulleys.

In FIG. 5, the coefficient of friction between belts, made according to the present invention and a cooperating pulley surface, was plotted versus the cumulative grinding time for the grinding wheel 46. It can be seen that the coefficient of friction was maintained relatively constant, and within an acceptable range for 2500 hours of grinding time for normal operating speeds between 7 m/sec and 32 m/sec.

Figure 7:
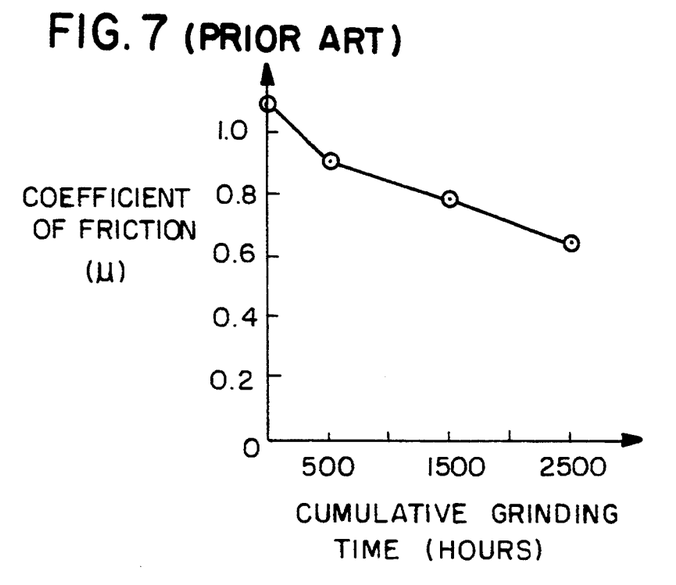
FIG. 7 is a graph showing the relationship between the cumulative grinding time for a grinding wheel and the frictional coefficient between the side surface of a belt formed with the grinding wheel by a conventional method and cooperating pulley.

In FIG. 7, the coefficient of friction between belts made utilizing conventional grinding techniques and a cooperating pulley surface is graphed over 2500 hours of use for a single grinding wheel. The grinding wheel was rotated at a constant 25 m/sec during the test. Initially, the coefficient of friction was quite high so that there was a substantial binding force between the belt and associated pulley which produces the "slip-stick" noise. After 2500 hours, the coefficient of friction between the side surfaces and a cooperating pulley surface was substantially diminished. There was a substantial variation in the frictional characteristics of these belts over the life of the grinding wheel.

Figure 8:
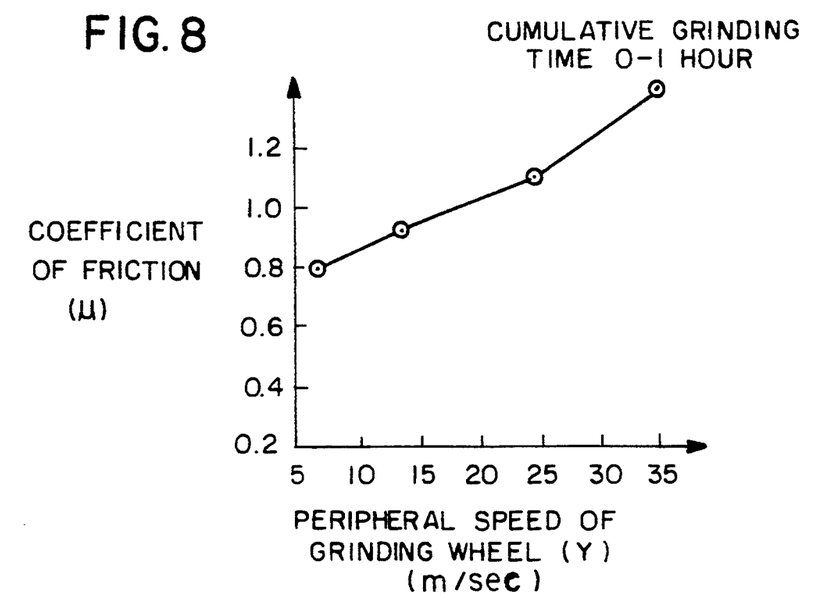
FIG. 8 is a graph showing the relationship between the circumferential speed of the grinding wheel and the frictional coefficient between a belt made therewith and cooperating pulleys.

In FIG. 8, results are shown for a test conducted to determine the effect of the speed of the cutting surface 56 of the grinding wheel 46 on the coefficient of friction between a belt side surface formed thereby and a cooperating pulley. The coefficient of friction was significantly increased as the speed of the cutting surface 56 was increased from 5 to 35 m/sec.

The foregoing disclosure of specific embodiments is intended to be illustrative of the broad concepts comprehended by the invention.

I claim:

1. A method of forming a rib on a power transmission belt, said method comprising the steps of:
   providing an endless belt body having an elastic material to define at least a part of a longitudinal rib on a completed power transmission belt;
   providing a grinding wheel with a peripheral cutting surface,
   said peripheral cutting surface having a radius;
   rotating the grinding wheel in a first rotational direction; pressing the peripheral cutting surface of the grinding wheel against the belt body and grinding the body to define a rib thereon with an exposed surface defined by the elastic material; and
   increasing the rotational velocity of the peripheral cutting surface amount calculated based on cumulative grinding time to maintain the rotational velocity of the peripheral surface at a predetermined relationship to cumulative grinding time to compensate for wear on the grinding wheel that alters cutting characteristics of the cutting surface regardless of whether or not the radius of the cutting surface has changed appreciably.

2. The method of forming a rib on a power transmission belt according to claim 1 wherein the step of altering the rotational velocity comprises the step of altering the rotational velocity of the peripheral cutting surface to maintain the frictional coefficient between the grinding wheel and belt body within a predetermined range.

3. The method of forming a rib on a power transmission belt according to claim 1 including the step of moving the endless belt body in a rotational path in a second rotational direction.

4. The method of forming a rib on a power transmission belt according to claim 3 wherein the belt body and grinding wheel are rotated in the same rotational direction.

5. The method of forming a rib on a power transmission belt according to claim 3 wherein the belt body and grinding wheel are rotated in opposite rotational directions.

6. The method of forming a rib on a power transmission belt according to claim 1 wherein the step of providing an endless belt body comprises the step of providing an endless belt body having an elastic material that is a) at least one of natural rubber (NR), styrene-butadiene rubber (SBR), chloroprene rubber (CR), and b) a mixture thereof.

7. The method of forming a rib on a power transmission belt according to claim 1 including the step of providing staple reinforcing fibers in the elastic material in the belt body so that the reinforcing fibers extend transversely to the length of the power transmission belt.

8. The method of forming a fib on a power transmission belt according to claim 1 wherein the step of providing staple reinforcing fibers comprises the step of providing staple reinforcing fibers that are one of a) synthetic yarn made of at least one of nylon, vinylon, polyester and aromatic polyamide multifilaments and b) a yarn that is a mixture of natural fiber yarns made of at least one of cotton and pulp with the synthetic yarn.

9. The method of forming a rib on a power transmission belt according to claim 8 wherein said grinding step comprises the step of grinding the elastic material and the staple reinforcing fibers.

10. The method of forming a rib on a power transmission belt according to claim 1 wherein the step of providing a grinding wheel comprises the step of providing a grinding wheel having a grinding surface having a diamond polishing material of 50-200 mesh.

11. The method of forming a rib on a power transmission belt according to claim 1 wherein the grinding step comprises the step of utilizing a grinding wheel with a plurality of V-shaped cutting surfaces and grinding the belt body with the grinding wheel to simultaneously define a plurality of ribs.

12. A method of forming a rib on a power transmission belt, said method comprising the steps of:
providing an endless belt body having an elastic material to define at least a part of a longitudinal rib on a completed power transmission belt;
providing a grinding wheel with a peripheral cutting surface;
rotating the grinding wheel in a first rotational direction;
pressing the peripheral cutting surface of the grinding wheel against the belt body and grinding the body to define a rib thereon with an exposed surface defined by the elastic material; and
altering the rotational velocity of the peripheral cutting surface to compensate for wear on the grinding wheel,
wherein the step of altering the rotational velocity comprises the step of altering the rotational velocity of the peripheral cutting surface to maintain the coefficient of friction between the cutting surface and belt body from ±0.1 from a preselected coefficient of friction for a speed of 7-32 m/sec of the peripheral cutting surface on the grinding wheel.

13. A method of forming a rib on a power transmission belt, said method comprising the steps of:
providing an endless belt body having an elastic material to define at least a part of a longitudinal rib on a complete power transmission belt;
providing a grinding wheel with a peripheral cutting surface;
rotating the grinding wheel in a first rotational direction;
pressing the peripheral cutting surface of the grinding wheel against the belt body and grinding the body to define a rib thereon with an exposed surface defined by the elastic material; and
altering the rotational velocity of the peripheral cutting surface to compensate for wear on the grinding wheel,
wherein the step of altering the rotational velocity of the peripheral cutting surface comprises the step of altering the rotational velocity so that the speed of the peripheral surface of the grinding wheel is as follows:

$$0.8\ (7+X/100) \leq Y \leq 1.2\ (7+X/100),$$

where Y (m/see) is the speed of the peripheral surface of the grinding wheel and X (hours) is the cumulative grinding time for the grinding wheel.

14. A method of forming a side surface on a power transmission belt, said method comprising the steps of:
providing an endless belt/belt sleeve made at least partially from an elastic material;
providing a grinding wheel with a peripheral cutting surface;
rotating the grinding wheel in a first rotational direction;
pressing the peripheral surface of the grinding wheel against the belt/belt sleeve and grinding the belt/belt sleeve as the belt/belt sleeve is advanced in a second rotational direction; and
setting the rotational velocity of the grinding wheel so that the rotational velocity of the peripheral cutting surface is a function of the cumulative grinding time for the grinding wheel set according to the following:

$$0.8\ (7+X/100) \leq Y \leq 1.2\ (7+X/100),$$

where Y (m/sec) is the speed of the peripheral surface of the grinding wheel and X (hours) is the cumulative grinding time for the grinding wheel.

15. A method of forming a side surface on a power transmission belt, said method comprising the steps of:
providing an endless belt/belt sleeve made at least partially from an elastic material;
providing a grinding wheel with a peripheral cutting surface;
rotating the grinding wheel in a first rotational direction;
pressing the peripheral surface of the grinding wheel against the belt/belt sleeve and grinding the belt/belt sleeve as the belt/belt sleeve is advanced in a second rotational direction; and
setting the rotational velocity of the grinding wheel so that the rotational velocity of the peripheral cutting surface is a function of the cumulative grinding time for the grinding wheel set according to the following:

$$0.8\ (7+X/100) \leq Y \leq 1.2\ (7+X/100),$$

where Y (m/see) is the speed of the peripheral surface of the grinding wheel and X (hours) is the cumulative grinding time for the grinding wheel,
wherein the belt/belt sleeve has an axial width and the grinding step comprises the step of grinding less than the entire width of the belt/belt sleeve with the grinding wheel and repeating the grinding step with the grinding wheel in a plurality of different axial positions relative to the belt/belt sleeve.

16. A method of forming a side surface on a power transmission belt, said method comprising the steps of:
providing an endless belt/belt sleeve made at least partially from an elastic material;
providing a grinding wheel with a peripheral cutting surface;
rotating the grinding wheel in a first rotational direction;
pressing the peripheral surface of the grinding wheel against the belt/belt sleeve and grinding the belt- /belt sleeve as the belt/belt sleeve is advanced in a second rotational direction; and setting the rotational velocity of the grinding wheel so that the rotational velocity of tho peripheral cutting surface is a function of the cumulative grinding time for the grinding wheel set according to the following:

$$0.8 s(7+X/100) \leq Y \leq 1.2 (7+X/100),$$

where Y (m/see) is the speed of the peripheral surface of the grinding wheel and X (hours) is the cumulative grinding time for the grinding wheel, said method further including the steps of providing a forming drum and sequentially building up a plurality of belt components in inside out order to define said belt/belt sleeve and grinding the belt/belt sleeve with the belt/belt sleeve on the forming drum.

17. A method of forming a side surface on a power transmission belt, said method comprising the steps of:

providing an endless belt/belt sleeve made at least partially from an elastic material;

providing a grinding wheel with a peripheral cutting surface;

rotating the grinding wheel in a first rotational direction;

pressing the peripheral surface of the grinding wheel against the belt/belt sleeve and grinding the belt/belt sleeve as tho belt/belt sleeve is advanced in a second rotational direction; and setting the rotational velocity of the grinding wheel so that the rotational velocity of the peripheral cutting surface is a function of the cumulative grinding time for the grinding wheel set according to the following:

$$0.8 (7+X/100) \leq Y \leq 1.2 (7+X/100),$$

where Y (m/sec) is the speed of the peripheral surface of the grinding wheel and X (hours) is the cumulative grinding time for the grinding wheel, wherein the belt/belt sleeve and grinding wheel are rotated in the same rotational direction.

18. A method of forming a side surface on a power transmission belt, said method comprising the steps of:

providing an endless belt/belt sleeve made at least partially from an elastic material;

providing a grinding wheel with a peripheral cutting surface;

rotating the grinding wheel in a first rotational direction;

pressing the peripheral surface of the grinding wheel against the belt/belt sleeve and grinding the belt/belt sleeve as the belt/belt sleeve is advanced in a second rotational direction; and setting the rotational velocity of the grinding wheel so that the rotational velocity of the peripheral cutting surface is a function of the cumulative grinding the for the grinding wheel set according to the following:

$$0.8 (7+X/100) \leq Y \leq (7+X/100),$$

where Y (m/sec) is the speed of the peripheral surface of the grinding wheel and X (hours) is the cumulative finding time for the grinding wheel, wherein the belt/belt sleeve and grinding wheel are rotated in opposite rotational directions.

19. A method of forming a side surface on a power transmission belt, said method comprising the steps of:

providing an endless belt/belt sleeve made at least partially from an elastic material;

providing a grinding wheel with a peripheral cutting surface;

rotating the grinding wheel in a first rotational direction;

pressing the peripheral surface of the grinding wheel against the belt/belt sleeve and grinding the belt/belt sleeve as the belt/belt sleeve is advanced in a second rotational direction; and setting the rotational velocity of the grinding wheel so that the rotational velocity of the peripheral cutting surface is a function of the cumulative grinding time for the grinding wheel set according to the following:

$$0.8 (7+X/100) \leq Y \leq (7+X/100),$$

where Y (m/sec) is the speed of the peripheral surface of the grinding wheel and X (hours) is the cumulative grinding time for the grinding wheel, said method further including the step of providing staple reinforcing fibers in the elastic material in the belt/belt sleeve so that the reinforcing fibers extend transversely to the length of the power transmission belt.

20. The method of forming a side surface on a power transmission belt according to claim 19 wherein said grinding step comprises the step of simultaneously grinding the elastic material and the staple reinforcing fibers.

21. A method of forming a side surface on a power transmission belt, said method comprising the steps of:

providing an endless belt/belt sieve made at least partially from an elastic material;

providing a grinding wheel with a peripheral cutting surface;

rotating the grinding wheel in a first rotational direction;

pressing the peripheral surface of the grinding wheel against the belt/belt sleeve and grinding the belt/belt sleeve as the belt/belt sleeve is advanced in a second rotational direction; and setting the rotational velocity of the grinding wheel so that the rotational velocity of the peripheral cutting surface is a function of the cumulative grinding time for the grinding wheel set according to the following:

$$0.8 (7+X/100) \leq Y \leq 1.2 (7+X/100),$$

where Y (m/sec) is the speed of the peripheral surface of the grinding wheel and X (hours) is the cumulative grinding time for the grinding wheel, wherein the step of providing a grinding wheel comprises the step of providing a grinding wheel having a grinding surface having a diamond polishing material of 50–200 mesh.

22. A method of forming a surface on a power transmission belt, said method comprising the steps of:

providing an endless belt/belt sleeve made at least partially from an elastic material;

providing a grinding wheel with a peripheral cutting surface with diamond material thereon of 50-200 mesh;

rotating the grinding wheel in a first rotational direction;

pressing the peripheral surface of the grinding wheel against the belt/belt sleeve and grinding the belt-/belt sleeve as the belt/belt sleeve is advanced in a second rotational direction; and setting the rotational velocity of the grinding wheel so that the rotational velocity of the peripheral cutting surface is a function of the cumulative grinding time for the grinding wheel set according to the following:

$$0.8\,(7+x/100) \leq Y \leq 1.2\,(7+x/100),$$

where $Y$ (m/sex) is the speed of the peripheral surface of the grinding wheel and $X$ (hours) is the cumulative grinding time for the grinding wheel.

23. A method of forming a surface on a power transmission belt, said method comprising the steps of:

providing an endless belt/belt sleeve made at least partially from an elastic material;

providing a grinding wheel with a peripheral cutting surface with diamond material thereon of 50-200 mesh;

rotating the grinding wheel in a first rotational direction;

pressing the peripheral surface of the grinding wheel against the belt/belt sleeve and grinding the belt-/belt sleeve as the belt/belt sleeve is advanced in a second rotational direction; and setting the rotational velocity of the grinding wheel so that the rotational velocity of the peripheral cutting surface is a function of the cumulative grinding time for the grinding wheel set according to the following:

$$0.8\,(7+x/100) \leq Y \leq 1.2\,(7+X/100)$$

where $Y$(m/sec) is the speed of the peripheral surface of the grinding wheel and $X$ (hours) is the cumulative grinding time for the grinding wheel, said method further including the step of forming the belt/belt sleeve by sequentially building up components on a forming drum including placing a plurality of short staple reinforcing fibers in said elastic material so that the fibers project transversely to the length of the power transmission belt.

24. The method of forming a surface on a power transmission belt according to claim 23 wherein the belt/belt sleeve has an axial width and the grinding step comprises the step of grinding less than the entire width of the belt/belt sleeve with the grinding wheel and repeating the grinding step with the grinding wheel in a plurality of different axial positions relative to the belt-/belt sleeve.

25. The method of forming a surface on a power transmission belt according to claim 24 including the step of rotating the belt/belt sleeve in a second rotational direction during grinding.

26. The method of forming a surface on a power transmission belt according to claim 25 including the step of vulcanizing the belt/belt sleeve before carrying out the grinding step.

* * * * *